(12) United States Patent
Kranendonk et al.

(10) Patent No.: US 9,348,631 B2
(45) Date of Patent: May 24, 2016

(54) FILE MAPPING AND CONVERTING FOR DYNAMIC DISK PERSONALIZATION FOR MULTIPLE PLATFORMS

(71) Applicant: Novell, Inc., Provo, UT (US)

(72) Inventors: Nathaniel Brent Kranendonk, Springville, UT (US); Jason Allen Sabin, Lehi, UT (US); Lloyd Leon Burch, Payson, UT (US); Jeremy Ray Brown, Bluffdale, UT (US); Kal A. Larsen, Springville, UT (US); Michael John Jorgensen, Mapleton, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 14/459,858

(22) Filed: Aug. 14, 2014

(65) Prior Publication Data

US 2014/0359623 A1 Dec. 4, 2014

Related U.S. Application Data

(63) Continuation of application No. 13/220,366, filed on Aug. 29, 2011, now Pat. No. 8,812,766, which is a continuation-in-part of application No. 12/706,813, filed on Feb. 17, 2010, now Pat. No. 8,140,735.

(51) Int. Cl.
*G06F 9/45* (2006.01)
*G06F 9/455* (2006.01)
(Continued)

(52) U.S. Cl.
CPC ............ *G06F 9/45533* (2013.01); *G06F 9/455* (2013.01); *G06F 17/30067* (2013.01); *G06F 17/30129* (2013.01); *G06F 17/30174* (2013.01); *G06F 17/30179* (2013.01);
(Continued)

(58) Field of Classification Search
CPC ............................ G06F 9/455; G06F 17/30179
USPC ....................................................... 711/6, 111
See application file for complete search history.

(56) References Cited

U.S. PATENT DOCUMENTS 5,142,624 A 8/1992 Patrick, II
6,385,606 B2 5/2002 Inohara et al.
(Continued)

OTHER PUBLICATIONS

"3.1 Guidelines for Configuring and Using Dynamic Storage Technology", From Dynamic Storage Technology 1.0 Administration Guide, Novell Open Enterprise Server, Nov. 9, 2009, [Online] Retrieved from the Internet: http://www.novell.com/documentation/oes2/stor_dst_lx/?page=/documentation/oes2/stor_dst_lx/data/ba2iqlh.html, (Nov. 9, 2009).

(Continued)

*Primary Examiner* — Than Nguyen
(74) *Attorney, Agent, or Firm* — Schwegman, Lundberg & Woessner, P.A.

(57) ABSTRACT

File mapping and converting for dynamic disk personalization for multiple platforms are provided. A volatile file operation is detected in a first platform. The file supported by the first platform. A determination is made that the file is sharable with a second platform. The volatile operation is performed on the file in the first platform and the modified file is converted to a second file supported by the second platform. The modified file and second file are stored in a personalized disk for a user. The personalized disk is used to modify base images for VMs of the user when the user accesses the first platform or second platform. The modified file is available within the first platform and the second file is available within the second platform.

20 Claims, 4 Drawing Sheets

(51) Int. Cl.
 *G06F 17/30* (2006.01)
 *G06F 12/10* (2016.01)

(52) U.S. Cl.
 CPC .... *G06F 12/109* (2013.01); *G06F 2009/45562* (2013.01); *G06F 2009/45583* (2013.01)

(56) References Cited

U.S. PATENT DOCUMENTS

| | | | |
|---|---|---|---|
| 6,766,454 | B1 | 7/2004 | Riggins |
| 7,188,364 | B2 | 3/2007 | Volpano |
| 7,533,110 | B2 | 5/2009 | Kreiner et al. |
| 7,681,122 | B1 * | 3/2010 | Tsykora ........................ 715/249 |
| 7,797,743 | B2 | 9/2010 | Treacy et al. |
| 8,140,735 | B2 | 3/2012 | Burch et al. |
| 8,539,136 | B2 | 9/2013 | Burch et al. |
| 8,812,766 | B2 | 8/2014 | Kranendonk |
| 8,949,505 | B2 | 2/2015 | Burch et al. |
| 2005/0257129 | A1 * | 11/2005 | Kreiner et al. ................ 715/500 |
| 2007/0156804 | A1 | 7/2007 | Mo |
| 2007/0288228 | A1 | 12/2007 | Taillefer et al. |
| 2008/0127348 | A1 | 5/2008 | Largman et al. |
| 2008/0195760 | A1 | 8/2008 | Nudler |
| 2008/0232295 | A1 | 9/2008 | Kreiner et al. |
| 2009/0125902 | A1 | 5/2009 | Ghosh et al. |
| 2009/0216908 | A1 | 8/2009 | Moromisato et al. |
| 2009/0228654 | A1 | 9/2009 | Lakowicz |
| 2009/0300149 | A1 | 12/2009 | Ferris et al. |
| 2010/0036889 | A1 | 2/2010 | Joshi et al. |
| 2010/0175064 | A1 | 7/2010 | Brahmaroutu |
| 2010/0299371 | A1 | 11/2010 | Little et al. |
| 2010/0332453 | A1 * | 12/2010 | Prahlad et al. ................ 707/640 |
| 2011/0191358 | A1 | 8/2011 | Kuo et al. |
| 2011/0313982 | A1 | 12/2011 | Kranendonk et al. |
| 2012/0151132 | A1 | 6/2012 | Burch et al. |
| 2014/0019971 | A1 | 1/2014 | Burch et al. |
| 2014/0380316 | A1 | 12/2014 | Burch et al. |

OTHER PUBLICATIONS

"Web Performance monitor for zVM RTM/ESA", IBM, (2003), 3 pages.

* cited by examiner

FILE MAPPING AND CONVERTING FOR DYNAMIC DISK PERSONALIZATION FOR MULTIPLE PLATFORMS

RELATED APPLICATIONS

The present application is a continuation of U.S. patent application Ser. No. 13/220,336, filed Aug. 29, 2011, now issued as U.S. Pat. No. 8,812,766, which is a Continuation-In Part of, and claims the benefit of priority under 35 U.S.C. 119(e) to, U.S. Ser. No. 12/706,813, filed on Feb. 17, 2010, now issued as U.S. Pat. No. 8,140,735, and entitled: "Techniques for Dynamic Disk Personalization" each disclosure of which is incorporated by reference in its entirety herein.

BACKGROUND

Increasingly, services and communication are achieved over the Internet and the World-Wide Web (WWW). Geographical location is becoming irrelevant with respect to network connectivity. Furthermore, the physical devices used by individuals to communicate and conduct business are increasingly becoming transparent through machine virtualization techniques and miniaturized.

As the industry uses more and more virtualization, there exists a problem on how the changes made by the end user are saved and restored. The end user may start out with a standard virtual machine (VM) image but as soon as a new program is added, some programs are run or files are saved, the image must be saved as an entirely new image or the changes will be lost if the user ends and restarts the user's VM. A user can map a personal disk to the running VM image and use it for all changes and installs, but this does not solve the problem. The reason for this is that when software is installed or runs it is common for the software to write to the root/boot drive. Writing to the root drive changes the base image, such that the base image must now be saved as a new image. This entire process can consume large amounts of storage/disk and add a required step to the end user. The described situation also adds new ways to lose data, time, and disk space.

As industries move to the cloud (a type of virtual environment), there exists a problem with how images are stored. Currently in a cloud or a Virtual Desktop Infrastructure (VDI) environment, a user clones his/her desktop from a base template. This machine may only really be used from 8:00 a.m. to 5:00 p.m. But, this machine cannot be deleted because it contains changes made by the end user.

Previous advancements made in the industry by Novell, Inc. of Waltham, Mass. solve this problem by writing all changes made by an end user to a separate disk. So, anytime a write is attempted to the image, the write operation is intercepted by a filter, and then the write operation actually occurs on a mapped drive. When the image or operating system (OS) of the image attempts to read from disk and if the filter detects that the file has been modified then the read operation actually occurs on the mapped drive. In this manner, all changes made to an image are stored elsewhere so one can delete the image and recreate it the next day. The filter on the new image reads and writes to the mapped drive assigned to the end user. With dynamic disk personalization one never stores a VM for anyone. There is a same base VM image for everyone with a disk attached containing all changes customized for each individual end user. The end user has no idea that the dynamic file relocation is happening or that he/she even has a personal disk.

However, there are some people that do a lot of work on different platforms (different OS environments, file systems, machine environments, etc.). An end user may run multiple different versions of WINDOWS® and/or LINUX®. If a particular end user has a WINDOWS® 7 and an OPENSUSE® 11.3 desktop in the cloud then there may need to be two different personal disks (one for WINDOWS® 7 and one for OPENSUSE®). So, if the end user has two separate personal disks then when he/she is using OPENSUSE®, he/she will not have access to files created when he/she was using WINDOWS® 7. The end user may elect to use some kind of file sharing software that stores the files on another server but this is more work for the end user and it will not be transparent or seamless to the end user.

SUMMARY

In various embodiments, techniques for file mapping and converting for dynamic disk personalization for multiple platforms are presented. More specifically, and in an embodiment, a method for file conversion across multiple platforms is provided.

DETAILED DESCRIPTION

Figure 1:
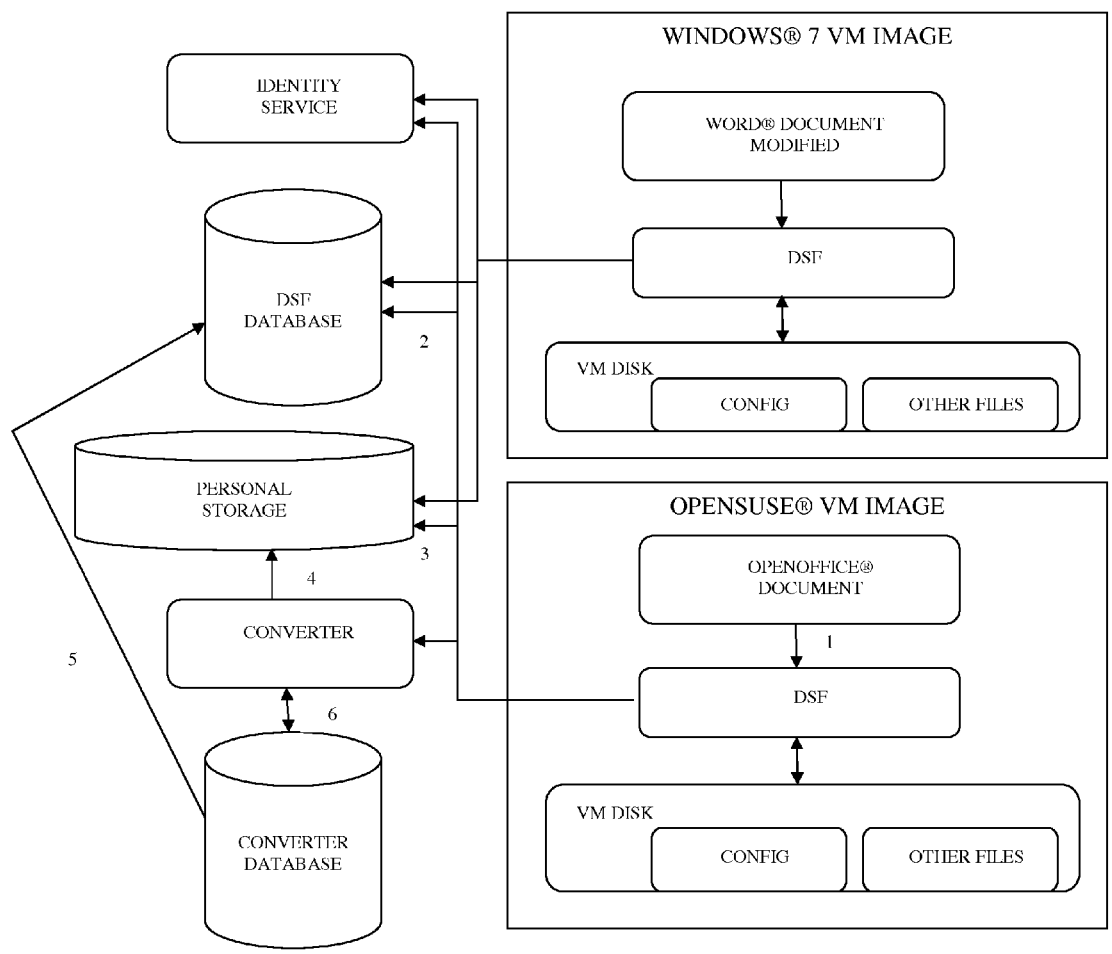
FIG. 1 is a diagram of an example architecture for file mapping and converting for dynamic disk personalization for multiple platforms, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "virtual machine" (VM) may be viewed as a logical processing environment overlaid or superimposed on a physical device. The VM is a logical machine that is independent of its physical process environment or physical machine. It may include its own operating system (OS), its own file system (FS), its own directory services, etc., which may each be different from the physical processing environment.

A "virtual image" is a specific instance of a VM. That is, the virtual image is the configuration data that when processed becomes an executing instance of a VM. The virtual image creates or instantiates a specific VM.

The terms "platform," "desktop," and "OS" may be used interchangeably and synonymously herein and below. One platform, desktop, or OS is disparate from another platform, desktop, or OS when it is a different OS entirely from another OS (such as LINUX® versus WINDOWS®; Linux® versus LEOPARD® and so on). Emphasis Added. As used herein, a platform, OS, or desktop is different from another platform, OS, or desktop when it is a different version of a same OS (such as WINDOWS® VISTA® versus WINDOWS® 95; and so on) or when it is a different OS entirely from another OS (such as LINUX® versus WINDOWS®; Linux® versus LEOPARD®; and so on). Emphasis Added. Moreover, the terms "desktop," "OS," and "platform" may precede the term "environment" (e.g., "desktop environment," "OS environment," and "platform environment") without changing the meaning of the terms used individually without the term "environment."

Various embodiments of this invention can be implemented in existing network architectures. For example, in some embodiments, the techniques presented herein are implemented in whole or in part in the Novell® operating system products, directory-based products and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

FIG. 1 is a diagram of an example architecture for file mapping and converting for dynamic disk personalization for multiple platforms, according to an example embodiment. The components of the architecture are implemented in a non-transitory machine-accessible and computer-readable storage medium as instructions that execute on one or more processors (machines, computers, processor-enabled devices, etc.). The processors are specifically configured to process the components of the architecture. Furthermore, the components are operational over and process within a network. The network may be wired, wireless, or a combination of wired and wireless.

As will be demonstrated herein, changes done by an end user on one desktop (OS environment, platform environment) is also automatically done on the other desktop (different and/or disparate OS environment from the first desktop). A mechanism is provided so a decision is made based on what files or changes can be shared between OS's (e.g., one would not want to share changes made to the WINDOWS® registry because they are useless on LINUX® but one would want to share changes made to a WORD® document).

To achieve this, the techniques described herein automatically detect what changes are sharable and what changes are not sharable to an end user's desktop.

There are a several ways this can be achieved to capture sharable changes made to a desktop (as used herein "desktop refers to a specific OS environment, such as LINUX®, WINDOWS®, LEOPARD® (from Apple®), etc.). For example, the type of file that is being saved by an end user within a specific desktop environment can be detected when the saved operation is issued (e.g., if the file extension is ".txt" or ".pdf" then it is assumed the file is a document and it is generally sharable across desktop environments). As another case, a location of a file can be used as an indication that it is to be shared across desktop environments (e.g., if the file is on a WINDOWS® desktop, in the "My Documents," "My Music," My Pictures," "Downloads," or in the end user's home directory, it is assumed that this file is one that can be shared across desktop environments. As another situation, a file written out of program files or the WINDOWS® registry are locations that indicate they are not to be shared across desktop environments.

With the techniques presented herein and below, there is one personal disk that is used for multiple platforms (OS environments, desktops, etc.). Anytime the end user tries to write a file to any desktop a filter intercepts the write operation and writes the file to the single personal disk. When the filter intercepts the write, the filter decides whether the file is to be shared and specifies whether it is shared in a database. If the file isn't shared then the platform for the file is specified in the database.

With the techniques presented herein and below, the end user is not aware of the personal disk or how the files are being shared between OS's (desktops). The end user just knows that when he/she makes changes on one desktop he/she is also making the same changes on his other desktops because his/her desktop includes the features described herein. So, the end user may use WINDOWS® 7 one day and OPENSUSE® the next day and still see all of his/her sharable work.

Now referring to the sample architecture and processing described in the FIG. 1.

A Dynamic Storage Filter (DSF) works by acting as a filter to all disk access done to disks, which are part of a VM image, by any program running in a VM. The DSF is loaded as part of the VM image and runs as the VM image starts/initiates. The DSF also determines whether files can be used by multiple platforms or can be converted to another file type supported by other platforms. In some embodiments, platforms (desktops, OS environments, etc.) can be different distributions/versions of a same OS, such as different versions of LINUX® or different versions of the WINDOWS® OS.

In the scenario presented in the FIG. 1, an end user starts with an OPENSUSE® VM image. While the end user has the image running he/she creates a new OPENOFFICE® document. When the end user saves the document and requests write access to file the document on the VM system (1), the DSF intercepts that request. The DSF checks the database (2) and determines if there is an entry for the file. In this example scenario there is not an entry in the database. The DSF then determines what kind of file this is and whether this file is specific to the platform (desktop, OS, etc.) or can be used by other platforms. The DSF also checks a location the end user is trying to save the file to within the VM. If the location is anywhere in the user or home directory the request is sent to the converter. Any other location identified and the file is determined to be specific to the VM image and the file is sent directly to personal storage where information about the file is stored in the DSF Database. In the example being discussed, the end user is trying to save the file to "My Documents" in the end user's home directory so the DSF sends the file to the converter.

The converter obtains the file extension of the file and checks a Converter Database for platform support. The Converter Database contains mappings on which platforms support different file types. It also contains information on which file types can be converted. In the presented example, the converter detects that the file extension is an ".odt" for an OPENOFFICE® document. When checking the database, the converter detects that the file can be converted to a ".doc" for MICROSOFT WORD® support on WINDOWS® platforms. The converter then converts the file to a ".doc" file type and adds both the ".odt" extension and the ".doc" extension to the personal storage associated with the VM image for the end user. The converter also adds entries to the DSF database with information about the file and which platforms each file supports (e.g., the ".odt" file extension is supported on all LINUX®-based platforms and the ".doc" extension is supported on all WINDOWS®-based platforms.

Next, the end user gets a WINDOWS® 7 image in a particular cloud. The end user can see the WORD® document that they created during his/her previous OPENSUSE® desktop session. The end user modifies the WORD® document and saves the document. The DSF intercepts that write request, checks the database and finds that there is an entry for this ".doc" file extension as well as for the ".odt" file extension. The ".doc" file with the end user's changes is sent to the converter. The converter also checks the DSF database for existing entries to determine that the file needs to be converted to ".odt" file as well. The converter converts the file and overwrites the ".doc" file and the ".odt" file in the personal storage. Now when the user logs back into his or her LINUX® VM in the cloud he/she sees that the changes are there from the prior WINDOWS® 7 VM.

If the end user tries to delete the document on either VM image (WINDOWS® and/or LINUX®) he/she has then the DSF intercepts the delete operation. The DSF checks the DSF database and finds the document that is to be deleted via the delete operation. The DSF then deletes both files found in the DSF database from the personal storage. Now when the user logs into either machine (WINDOWS® VM and/or LINUX® VM) he/she finds that the document has been deleted on both VM images.

There is another case where a change or creation of a file may not be in a location generally associated with sharing across platforms (desktops). For example, the WINDOWS® registry situation. In this case, the DSF intercepts a write request directed to the WINDOWS® registry and copies the file to personal storage. The DSF then adds an entry to the DSF database. Then, if the end user brings up another platform in the cloud this file is not known by that platform.

If a file delete operation is issued for a file from a program (e.g., WORD® Install), the file on the Personal Storage is deleted if present. If the file exists on the VM Disk the DSF Database is updated to show the deletion.

With the discussion of the FIG. 1, all functions are shown as single instances. This is only for the purpose of illustration as there can be many personal storage devices and the devices can be in many different locations. The techniques herein allow policy to define the selection of the personal storage devices used. The DSF Database may use many different personal storage devices for a single user and/or single VM and this can be identity based and controlled. So, the same identity used to select the personal storage can also be used to secure the data sent to the personal storage via encryption.

Moreover, an identity service can be used to validate the user, issue tokens, control access, and/or provide encryption. Thus, all of the features described herein may be identity enabled and identity driven.

File access to data is dynamically controlled as directed by identity and policy. This leads to less data duplication, higher security, less configuration issues, and a more transparent and seamless experience for the end user.

The techniques herein also solve many problems caused when there is a set of base machine images with different platforms used as templates for many people.

Figure 2:
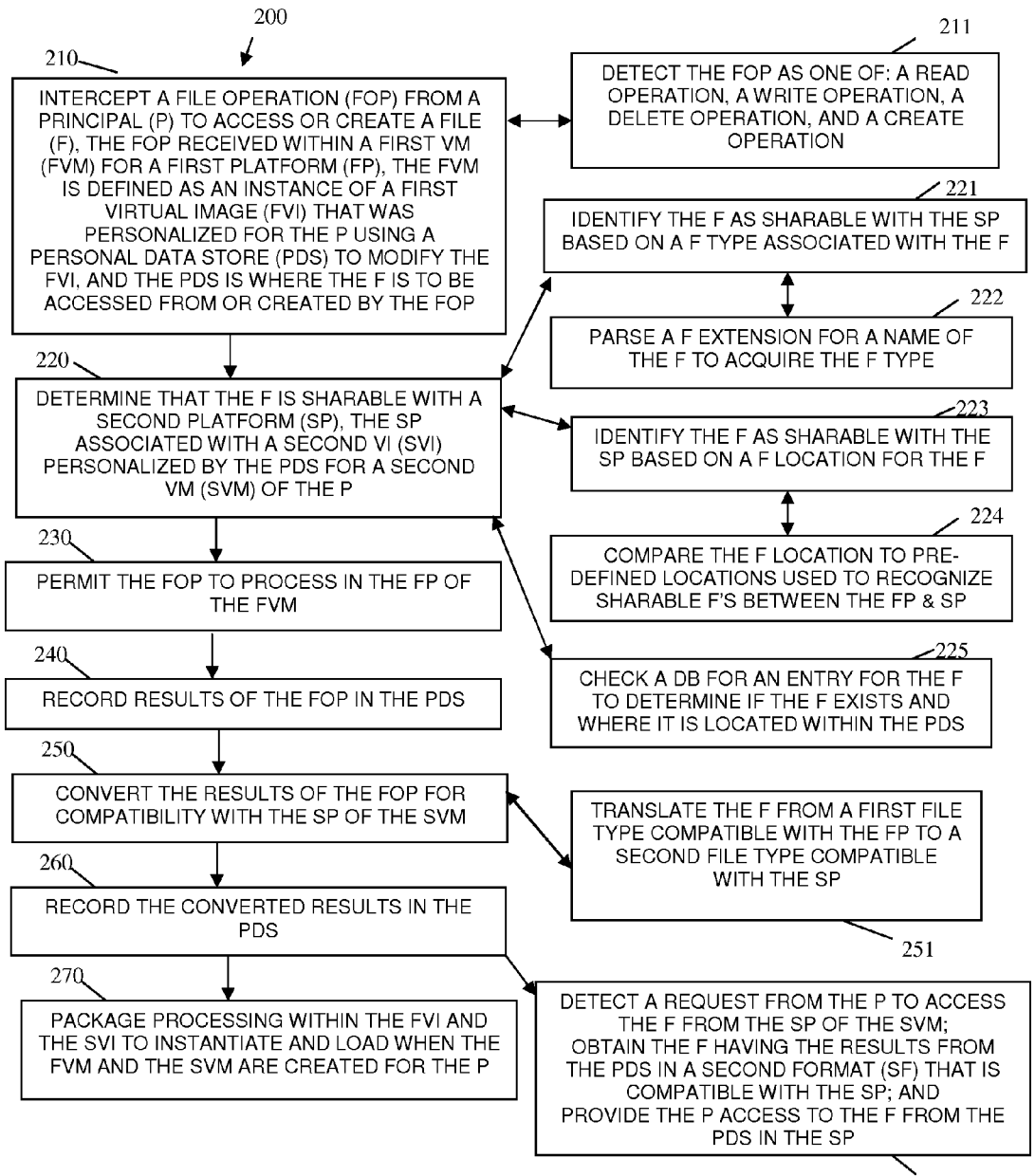
FIG. 2 is a diagram of a method for file conversion across multiple platforms, according to an example embodiment.

FIG. 2 is a diagram of a method 200 for file conversion across multiple platforms, according to an example embodiment. The method 200 (hereinafter "file conversion service") is implemented in a machine-accessible and computer-readable storage medium as instructions that execute on one or more processors of a network. The network may be wired, wireless, or a combination of wired and wireless. Furthermore, the processor (device having a processing instance of the file conversion service) is specifically configured to process the file conversion service.

The file conversion service represents various aspect of the architecture presented in the FIG. 1.

At 210, the file conversion service intercepts a file operation from a principal (user or automated service). The file operation is intercepted within a first VM for a first platform. The first VM is defined and instantiated as an instance of a first virtual image that was personalized and customized for the principal using a personal data store to modify and augment the base first virtual image. The principal is operating from within the first VM and the first platform and the file is to be accessed from or created by the requested file operation made by the principal within the first platform of the first VM.

The techniques and variations for using a base virtual image for multiple principals that is modified via personal data storage for each individual principal was discussed in detail in application Ser. No. 12/706,813 filed Feb. 10, 2010 entitled: "Techniques for Dynamic Disk Personalization;" the disclosure of which is incorporated by reference herein in its entirety. These techniques are enhanced herein by the embodiments provided.

According to an embodiment, at 211, the file conversion service identifies the file operation as one of: a read file operation, a write file operation, a create file operation, and/or a delete file operation.

At 220, the file conversion service determines that the file associated with the requested file operation is sharable between the first platform and a second platform. The second platform is an instantiation of a second VM instantiated from a second virtual image that is augmented and modified by the personal data storage. This is similar to how the first VM and first platform were created only from a different base image and again that base image personalized and customized for the principal using the personal data storage.

In an embodiment, at 221, the file conversion service identifies the file as being sharable with the second platform based on a particular file type that is associated with the file.

Continuing with the embodiment of 221 and at 222, the file conversion service parses a file extension from a name of the file to determine the file type.

In another case, the file conversion service may parse some of the embedded characters of the file to determine the file type.

In yet another situation, at 223, the file conversion service identifies the file as being sharable between the first platform and the second platform based on a file location for the file. Examples of this situation were described above in detail with the discussion of the FIG. 1.

Continuing with the embodiment of 223 and at 224, the file conversion service compares the file location with pre-defined locations used to recognize sharable files between the first platform and the second platform.

In yet another situation, at 225, the file conversion service checks a database for an entry for the file to determine if the file already exists and where it is located within the personal data storage. That is, a database can be used as a quick index to determine if the file already exists and what file types it is associated with, where it is located, and other metadata that can be used to determine whether the file that the file operation is directed to is sharable between the first platform and the second platform.

At 230, the file conversion service permits the first VM and its first platform to process the file operation.

At 240, the file conversion service records results from processing the file operation on the file in the personal data storage.

At 250, the file conversion service converts the results of processing the file operation for compatibility with the second platform of the second VM. That is, the file appears in two formats in the personal data storage, one that is supported in the first platform of the first VM and one that is supported by the second platform of the second VM.

It is also noted that just two platforms are being discussed for purposes of illustration but there can be N number of platforms in which case there are N versions of the file in the personal data storage, each format supported by a particular platform for a particular instantiation of a particular VM.

So, in an embodiment, at 251, the file conversion service translates the file from a first format type compatible with the first platform of the first VM to a second format type compatible with the second platform of the second VM.

At 260, the file conversion service records the converted results in the personal data storage of the principal.

According to an embodiment, at 270, the file conversion service packages the processing of 210-260 within the first virtual image and the second virtual image. This ensures that the file conversion service instantiates and loads when the first VM and the second VM are created for the principal. This ensures that the file is synchronized and compatible between the first and second platforms by making sure the file conversion service is always running within a particular platform for a particular VM of the principal.

In another embodiment, at 280, the file conversion service detects a subsequent request from the principal to access the file from the second platform of the second VM. Here, the file conversion service is another instance of itself that processes on the second platform. Next, the file conversion service obtains the file having the results from the personal data storage in a second format that is compatible with the second platform. In other words, a correct file format for the file that is supported on the second platform is obtained by the file conversion service for the principal. Then, the file conversion service provides the principal access to the file from the personal data storage in the second platform.

Figure 3:
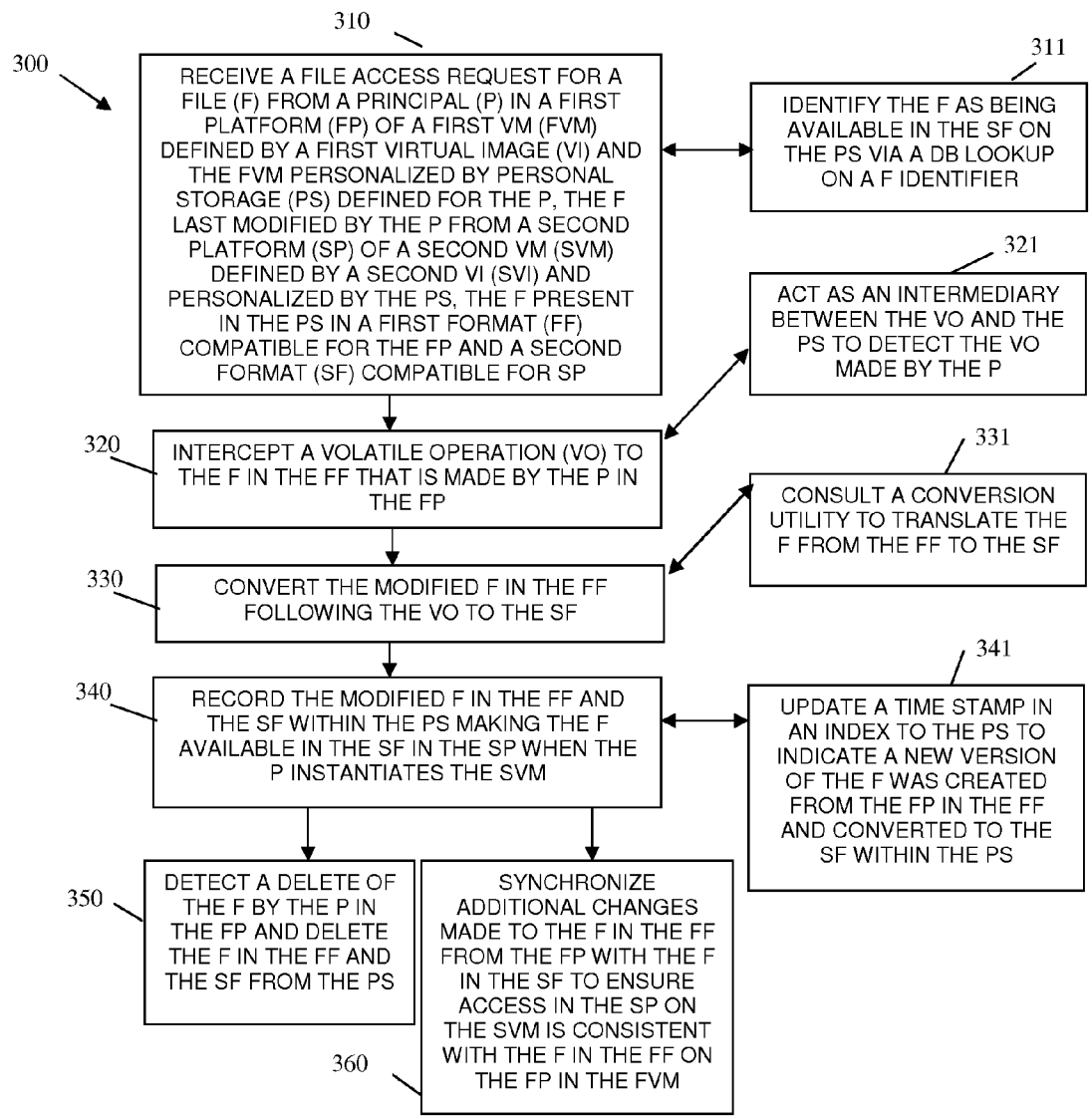
FIG. 3 is a diagram of another method for file conversion across multiple platforms, according to an example embodiment.

FIG. 3 is a diagram of another method 300 for file conversion across multiple platforms, according to an example embodiment. The method 300 (hereinafter "file manager") is implemented in a machine-accessible and computer-readable storage medium as instructions that execute on one or more processors of a network. The network may be wired, wireless, or a combination of wired and wireless. Furthermore, the processor (device having a processing instance of the file manager) is specifically configured to process the file manager.

The file manager represents another and in some instances an enhanced perspective of the file conversion service represented by the method 200 of the FIG. 2. The processing of the file manager assumes that a file being requested already exists and is sharable as defined by the FIGS. 1 and 2 above.

At 310, the file manager receives a file access request for a file from a principal of a first VM. The first VM defined by a first virtual image and the first VM is dynamically personalized and customized for the principal by applying personal storage defined by the principal and accessible via an authenticated principal identity for the principal. The file was last modified by the principal from a second platform of a second VM. Again, the second VM defined, customized, and personalized by the personal storage. The file present in the personal storage in a first format that is compatible for the first platform and a second format that is compatible for the second platform.

According to an embodiment, at 311, the file manager identifies the file as being available in the second format on the personal storage. The identification is achieved via a database lookup on a file identifier for the file.

At 320, the file manager intercepts a volatile operation to the file in the first format. The volatile operation made by the principal from the first platform. By volatile it is meant that some change has occurred to the file.

In an embodiment, at 321, the file manager acts as an intermediary between the volatile operation and the personal storage to detect the volatile operation made by the principal or an application being accessed by the principal within the first platform. By interjecting the file manager in front of the personal storage, volatile operations can be inspected before they are committed to the personal storage.

At 330, the file manager converts the modified file in the first format and following the processing of the volatile operation to the second format supported by the second platform for the second VM.

According to an embodiment, at 331, the file manager consults a third-party or even external conversion service to translate the file from the first format to the second format.

At 340, the file manager records the modified file in the first format and the second format within the personal storage. This makes the file available in the second format in the second platform when the principal instantiates the second virtual machine.

In an embodiment, at 341, the file manager updates a time stamp in an index to the personal storage to indicate a new version of the file was created from the first platform in the first format and then converted to the second format within the personal storage. This may be useful when the conversion includes errors to trace which platform recorded the last version. It is also useful for auditing.

According to an embodiment, at 350, the file manager detects a delete of the file by the principal in the first platform. The file manager then deletes the file in the first format and the second format from the personal storage.

In still another case, at 360, the file manager synchronizes additional changes made to the file in the first format from the first platform with the file in the second format to ensure access in the second platform on the second VM is consistent with the file in the first format on the first platform in the first VM.

Figure 4:
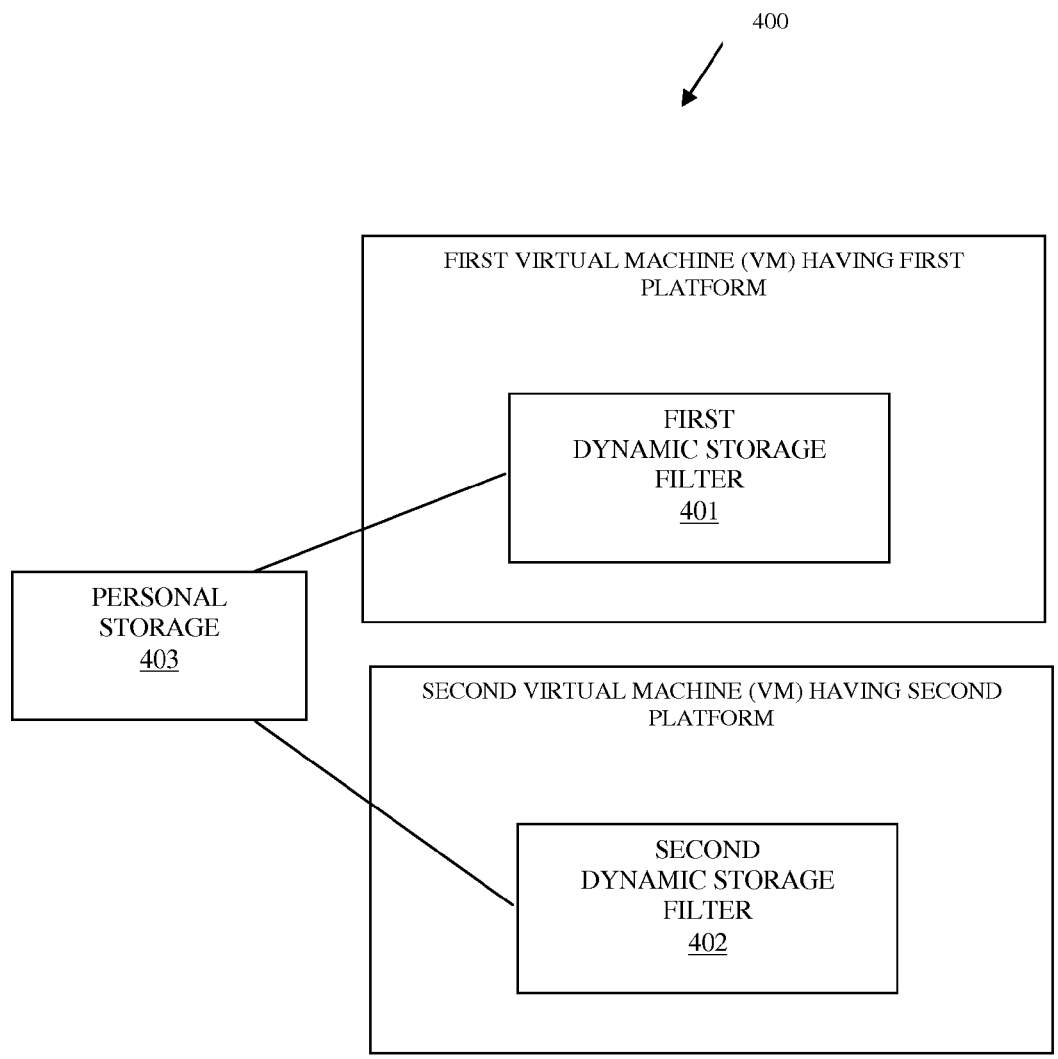
FIG. 4 is a diagram of a dynamic VM disk personalization and file conversion system, according to an example embodiment.

FIG. 4 is a diagram of a dynamic VM disk personalization and file conversion system 400, according to an example embodiment. The dynamic VM disk personalization and file conversion system 400 is implemented in a machine-accessible and computer-readable storage medium as instructions that execute on one or more processors (multiprocessor) and that is operational over a network. The one or more processors are specifically configured to process the components of the dynamic VM disk personalization and file conversion system 400. Moreover, the network may be wired, wireless, or a combination of wired and wireless.

In an embodiment, the dynamic VM disk personalization and file conversion system 400 implements, inter alia, certain aspects of the FIG. 1 and the methods 200 and 300 represented by the FIGS. 2 and 3, respectively.

The dynamic VM disk personalization and file conversion system 400 includes a first dynamic storage filter 401 and a second dynamic storage filter 402. In some cases, the dynamic VM disk personalization and file conversion system 400 also includes personal storage 403. Each of these and their interactions with one another will now be discussed in turn.

The first dynamic storage filter 401 is implemented in a non-transitory computer-readable storage medium and executes within a first VM having one or more first processors. Example aspects of the first dynamic storage filter 401 were presented above with respect to the FIGS. 1-3.

The first dynamic storage filter 401 configured to detect volatile operations made to a file in the first VM using a first platform. The file accessible in the first platform in a first format. The first dynamic storage filter 401 also configured to synchronize changes to the file in the first format to a second format compatible within a second platform of a second VM.

The second dynamic storage filter 402 is implemented in a non-transitory computer-readable storage medium and executes within a second VM having one or more second processors. Example aspects of the second dynamic storage filter 402 were presented above with respect to the FIGS. 1-3.

The first and second dynamic storage filters 401 and 402 are different instances of a same utility processing within different VMs.

The second dynamic storage filter 402 configured to detect volatile operations made to a file in the second VM using a second platform. The file accessible in the second platform in the second format. The second dynamic storage filter 402 also configured to synchronize changes to the file in the second format to the first format compatible within a first platform of a first VM.

According to an embodiment, the first VM is instantiated for a particular principal using a first VM image personalized by personal storage 403 for the first VM image, and the second VM is instantiated for the particular principal using a second VM image also personalized by the personal storage 403 for the second VM image.

Continuing with the previous embodiment, the file in the first format and the second format are simultaneously housed, recorded, and kept in synchronization with one another within the personal storage 403 for the particular principal.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing a file to a first platform compatible with that first platform;
recording results of a file operation made to the file in the first platform by processing as a filter for all disk access being made on the first platform; and
converting the results for compatibility with a second platform that is different from the first platform and writing the converted results in a single personal disk maintained for a user and re-converting the results and re-writing the re-converted results based on a particular platform from where the user subsequently accesses the re-converted results.

2. The method of claim 1, wherein providing further includes detecting a type for the file in the first platform based on a location where the first file is stored in the first platform.

3. The method of claim 1, wherein providing further includes detecting a type for the file in the first platform based on a save operation producing an extension to a file name for the file in the first platform.

4. The method of claim 1, wherein recording further includes intercepting a write operation made to the file in the first platform.

5. The method of claim 4, wherein intercepting further includes determining that the file is to be shared with the second platform.

6. The method of claim 1, wherein converting further includes obtaining a converting to translate the file in the first format to the second format.

7. The method of claim 1, wherein converting further includes recording the results and converted results in a personal data store for a user associated with the file.

8. The method of claim 1, where recording further includes housing the personal data store as a cloud-based desktop for the user accessible from the first platform and the second platform.

9. The method of claim 1, wherein recording further includes identifying the second platform as a virtual machine.

10. A method, comprising:
receiving an access request to a file within a first platform, the file last modified on a second platform that is different from the first platform;
accessing a personal storage for a desktop of a user associated with the file, and maintaining the personal storage as a single personal disk for the user and writing changes when made to the file by the user onto the single personal disk in a particular format for an application processed by the user to make those changes; and
delivering the file a first format from the personal storage to the user within the first platform.

11. The method of claim 10 further comprising, intercepting a volatile operation made by the user on the file in the first format within the first platform.

12. The method of claim 11 further comprising, converting results from the volatile operation of the file to a second format compatible with the second platform.

13. The method of claim 12 further comprising, storing the converted results for the file in the second format within the personal storage.

14. The method of claim 11, wherein intercepting further includes acting as an intermediary between the volatile operation and the personal storage.

15. The method of claim 11, wherein intercepting further includes identifying the volatile operation as a delete of the file from the first platform.

16. The method of claim 15, wherein identifying further includes removing the file housed in the personal storage in a second format for the second platform and the first format for the first platform.

17. A system, comprising:
- a processor; and
- a dynamic filter configured and adapted to: i) execute on the processor, ii) synchronize volatile operations on a file between a first platform and a second platform that are different from one another, iii) deliver a current version of the file to a user when requested from the first platform and the second platform, and iv) write the volatile operations to a single disk in a format that reflects a last volatile operation made to the file and manage from the single disk.

18. The system of claim 17, wherein the first platform is a first virtual machine and the second platform is a second virtual machine.

19. The system of claim 17, wherein the dynamic filter is further adapted and configured to maintain synchronization of the file and other files in a personal storage associated with a user that represents a cloud-based desktop for the user.

20. The system of claim 17, wherein the dynamic filter is further adapted and configured to act as an intermediary between volatile operations and the personal storage within the first platform and the second platform.

* * * * *